United States Patent Office 3,329,516
Patented July 4, 1967

3,329,516
BINDING AGENT FOR REFRACTORIES AND ITS MANUFACTURE
Theodor Chvatal, Vienna, Austria, assignor to Dr. Werner H. Kreidl, Vaduz, Liechtenstein
No Drawing. Filed Sept. 8, 1965, Ser. No. 485,906
Claims priority, application Austria, Nov. 15, 1960, A 8,498/60
15 Claims. (Cl. 106—66)

This is a continuation-in-part of my application Ser. No. 200,907 filed June 8, 1962 which became abandoned on Nov. 5, 1965; and which, in turn, was a continuation-in-part of my application Ser. No. 150,645, filed on Nov. 7, 1961 that became abandoned on Sept. 23, 1964.

The invention relates to binding agents, and relates more particularly to binding agents for refractories, and to methods for its manufacture.

It is known to use phosphates of Al, Mg, Zn, Fe and the like in the production of refractory products, particularly for the production of a binding agent or mortar for refractory products. Such phosphates are subject to various disadvantages.

The monophosphates, e.g. of the formula $$Al_2O_3.3P_2O_5.xH_2O$$

or $MgO.P_2O_5.xH_2O$ etc. are the only ones being actually stable during storage. These compounds, however, have minor colloidal properties and do not dry in air, but only upon being fired. Their high acidity is disadvantageous in basic materials, as it results in a very short processibility. They usually have low melting points. $Al_2O_3.3P_2O_5$ furthermore forms together with small amounts of $Al_2O_3$ a relatively low melting eutectic (1212° centigrade).

The bi-phosphates, for example $2Al_2O_3.3P_2O_5$, which have a higher metal oxide content, have considerably higher refractoriness, better colloidal properties and are drying in air. On the other hand, they are rather unstable and usually separate as a flocculent precipitate upon standing.

Apart from that, pure aluminum phosphate has the disadvantage that, in the presence of silicic acid, it unites with the latter to give silicates, phosphorus pentoxide being liberated and vaporized and being lost at the high temperatures used.

It has already been proposed (U.S. Patent No. 2,272,039, Morgan) to add hexavalent chromium oxide ($CrO_3$) to the above mentioned binding agent for refractory materials. The addition of the strongly acid $CrO_3$ does not increase the binding qualities of the mixture, neither in the cold nor upon moderate heating; such a binding agent neither shows any colloidal properties, nor does it dry on air and is therefore unable to form films. Because of the presence of the strongly oxidizing $CrO_3$ it is furthermore not possible to combine such mixture with organic materials, such as sulfite waste liquor or synethetic resins such as phenolic resins.

I now have found that by partially substituting the metal oxide in the above mentioned bi-phosphates by trivalent chromium oxide, $Cr_2O_3$, a completely stable, highly viscous binding agent results which possesses excellent film forming properties. Apart from that, the surface tension is lowered not only by the phosphorus pentoxide but also by the chromiumsesquioxide, whereby an improved adherence of the binding agent on the lean material is obtained. For the same reason refractory products which are produced with the aid of such binding agents, show considerably higher resistance to slag action than those which are produced by using a binding agent which consists of chromium-free phosphates, all other conditions being identical. $Cr_2O_3$ does not form any compound with $SiO_2$, and this is assumed to be the reason why chromium phosphate shows higher thermal stability in the presence of $SiO_2$ than pure aluminum phosphate or other metal phosphates.

With basic refractories the chromium sesquioxide forms spinels which have the advantage of an excellent binding strength up to high temperatures. Similar spinels are formed with the oxides of zinc, magnesium and iron whereby a good binding strength is achieved even if the $P_2O_5$ is volatilized at higher temperatures.

This new, highly colloidal and stable binding agent is produced according to the invention by mixing a solution of at least one monophosphate of Al, Fe, Zn or Mg with a solution of a trivalent chromium oxide ($Cr_2O_3$) which has been prepared by reducing a solution of a hexavalent chromium oxide ($CrO_3$) to a trivalent $Cr_2O_3$ with the help of reducing substances such as industrial type sugar, molasses or sawdust. This reduction has to be carried out under conditions which prevent the reactions from becoming too violent. The resulting product is a stable, highly viscous, film-forming binding agent for refractory materials. The molar ratio of metal to $Cr_2O_3$ is kept between 1 to 0.1 and 1 to 1. The metal-$Cr_2O_3$ component is used in amounts which substitute from 1.5 to 2.5 of the three hydrogen ions of phosphoric acid ($H_3PO_4$).

In a preferred embodiment of the invention, the proportion of $Cr_2O_3$ should suitably not be higher than would correspond to the formula $Me_2O_3.Cr_2O_3.3P_2O_5$ or $$MeO.Cr_2O_3.3P_2O_5$$

The metal of the metalphosphate and the $Cr_2O_3$ are thus present in amounts which substitute from 1.3 to 2.2 of the three hydrogen ions of phosphoric acid ($H_3PO_4$). Increasing chromium contents adversely affects slightly the colloidal characteristics, while the thermal resistance and the compatibility with acid materials, as e.g. silica and zircon ($ZrSiO_4$), are improved. Compared with pure metal phosphates, the mixed chromium phosphates have the advantage that they are soluble in water even at high metal oxide proportions. This fact makes it possible to introduce them into the matter in extremely fine distribution.

The new binding agent made according to the above described process may be mixed with about 20 to 95% by weight of a powdered lean material such as Fe, FeO, $Fe_2O_3$ or $Fe_3O_4$ or chromite ore, or with a powder obtained by grinding the particular refractory material which is used to manufacture the refractory building units (for example bricks) which are to be bound together by the new binding agent. In using chromite ore as the lean material (e.g. by mixing 50 kg. of the new binding agent with 100 kg. chromite ore of less than 80 mesh) care should be taken to let the mixture rest until the development of gases has ceased, since the chromite ore usually contains some carbonates. A cold setting binder may also be obtained by mixing the new binding agent with 1 to 10% by weight of an acid-hardening, thermosetting resin such as phenolic, cresolic and xylenolic resin.

It is known to encase basic as well as neutral, unfired moldables with sheet iron. When furnaces provided with such bricks are heated, the iron melts and oxidizes and combines with the adjoining bricks. It is thus possible to obtain a monolithic brick work.

Such sheet-metal encased bricks are being produced according to various known methods. Either dead-burned magnesite is pressed into sheet-iron cases, which method is not always successful; or metal spacers, which cover the refractory body on several of its sides, are connected with the body during the molding operation. This operation considerably reduces the output of the brick press, as the spacers have to be inserted before the matter is introduced into the mold. There exists furthermore the risk that the metal sheets which are parallel to the pressing direction are distorted during molding. It is also rather difficult to encase fired bricks with sheet metal.

The present invention now provides coating the inside of an iron or steel encasing with the binding agent according to the invention and then pressing the refractory material in the mold thus formed. The material according to the present invention may also be used for adhesively connecting sheet metal, mesh wire or the like to fired or unfired refractory bricks, particularly to basis and neutral bricks.

The present invention also provides the production of metal-encased refractory bodies by coating such bodies with the matter according to the present invention, wherein the binding agent contains from 20 to 95% by weight of powdered Fe, FeO, Fe$_3$O$_4$ and/or Fe$_2$O$_3$, such coating being effected in any known manner, e.g. by pasting-on, by spraying-on or by dipping. The consistency of the mass must suit the method applied. Fired as well as unfired bricks can thus be provided with a metal coating.

The layer should be dried first at normal or slightly elevated temperatures (e.g. 100° C.).

The matter can also be used as a mortar between the brick bodies when building up a brick work.

A refractory body is known which consists of two different parts, these two parts being connected when shaping the body by a metal sheet arranged between the two brick parts, which will melt at elevated temperatures, and the parts can expand and contract independently from each other. Production of such bodies is, of course, accompanied by the disadvantages common to the production of sheet metal encased bricks.

The present invention therefore provides to produce combined fired or unfired refractory bodies by producing the different parts separately and by adhesively connecting them with each other by means of the matter according to the present invention. Such connection can also be effected by applying a metal coating between the bricks by means of the matter according to the present invention.

It is therefore a particular advantage of the matter according to this invention that it may be used with great advantage for the production of metal encased fired refractory bodies.

It is known to insert the suspension member of bricks into the bricks when molding them. When producing such bricks special care has to be taken to exactly place the suspension member at the center of the brick.

The present invention now proposes to provide for recesses when pressing the bricks prior to adhesively connecting the bricks. The two bricks between which the suspension member is to engage, are suitably formed in reflected-image form so that the suspension member is arranged exactly at the center of the completed body. The suspension member is suitably provided with projections on that part which engages the brick, for the purpose of improved connection with the brick. The upper end of the suspension member can be formed as a gusset extending over the brick. It is, however, also possible to form the bodies and the suspension members in such a manner that the opening into which the suspension member extends, is provided in the head portion of the brick and is flush with its surface. Fired as well as unfired refractory bricks provided with suspension members can be produced in this manner.

The binding agent used is suitably a cold-setting adhesive, which, at the same time has good refractory characteristics, according to the present invention. This adhesive has the advantage that its bonding properties are not lost even at high temperatures in contradistinction to a great number of organic binding agents. In order to increase the bonding properties of the adhesive, particularly at low temperatures, however, adhesives which are effective at low temperatures, e.g. synthetic resins, such as acid-hardening (thermosetting) phenolic, cresolic or xylenolic resins, may be added. Thermosetting resins and/or silicone resins are of particular advantage. In the case of basic and neutral brick bodies, it is most advantageous to use magnesium- chrominum-phosphate.

The matter according to the present invention is not only suited as a mortar for adhesively connecting and for coating basic and neutral refractory bodies. It can also be used for any other type of refractory products, e.g. for the production of composite bricks of dense or porous bodies, or of brick combinations of different chemical compositions, e.g. magnesite and chamotte bricks in which no chemical reactions take place between magnesite and chamotte. In this case, however, the iron or iron oxide is suitably replaced by lean materials, the composition of which is identical (ratio 1:1) or similar to the composition of the composite bodies, or which react with the bodies to form refractory substance, or which do not react with the bodies at all.

Suitably, liquid adhesives or adhesive mixtures are used, which set at normal temperatures, e.g. phenolic resin plus aluminum-chromium phosphate. This is of particular importance in the case where the matter according to the invention is used as a mortar. Particularly in the case, where the matter according to the invention is used for producing coatings or for adhesively connecting bricks, it is also possible to use adhesives which set on heating, as the bodies thus formed are then dried in order to accelerate setting. The drying temperature is chosen in such a manner that the drying period is as short as possible and the heat consumption as low as possible. The drying temperature should preferably be between 80 and 180° C. The cold strength is thereby slightly improved.

The consistency of the matter is adjusted in dependence from the use. A coating matter must be fluid whereas a matter to be used as mortar should be just spreadable. The proportion of iron powder should be as high as possible and should suitably not be less than about 60% of the entire matter.

The iron is to be used preferably in the form of iron powder with particle sizes of not more than about 0.2 mm. Iron oxide has a higher melting point than iron and therefore is not as well-suited as iron. Furthermore, iron oxidizes at elevated temperatures in an exothermal reaction whereby the ceramic bondage is accelerated.

Metallic iron powder is preferably protected against the action of aluminum phosphate etc., by adding 0.003 to 0.1% by weight of the whole mass of inhibiting agents, such as urotropine, quinoline, etc., in order to avoid gas (hydrogen) formation. An excess of CrO$_3$ (chromic acid) also acts as inhibiting agent.

The invention will be further described with reference to the following examples.

*Example 1*

100 liters of an 80% commercial phosphoric acid (corresponding to a solution of about 170 kg. phosphoric acid in 100 liters of water) are heated, in an acid resistant container, equipped with a stirring mechanism, to a temperature of somewhat above 100° C., and 13 kg. hexavalent chromium oxide (CrO$_3$) are dissolved therein. The CrO$_3$ is then reduced to Cr$_2$O$_3$ by slowly and carefully adding under stirring a solution of 3 kg. industrial sugar. Since this reaction is exothermic, no further heating of the reaction vessel is necessary once the reaction has started. A small amount of the CrO$_3$ will not be reduced to Cr$_2$O$_3$ and will act as inhibitor. It should be kept in mind that the reaction starts slowly but then becomes vigorous and the liquid may foam over. Therefore the reaction vessel should be only half filled at the start and stirring should be constant and vigorous.

After the reduction, 35 kg. of hydrate of alumina are gradually added. According to the nature and quality of the hydrate of alumina, lumps may be forming in the last phase of the neutralization. This may be avoided by adding the last portions of the alumina in form of a suspension in water. Towards the end of the neutralization a film starts to form on the surface of the solution, which is an indication that the product has good film-forming properties on contact with air.

When the reaction is completed, the resulting liquid binding agent is diluted with water to the desired density.

To prevent hydrolysis, the water is acidified, preferably with phosphoric acid, to a pH of about 1.2. If there should be some unreacted alumina left, the liquid binding agent is allowed to stand until the unreacted portions have settled, whereupon the liquid is decanted.

Experience has shown that for most purposes the binding agent made according to the invention is used best at a density of about 1.4 to 1.5 grams per milliliter. The binding agent produced in accordance with the above described example has a ratio of $Al_2O_3:Cr_2O_3:P_2O_5$ which equals 1:0.45:3 and a pH value of 1.4 to 1.5.

The sequence of the steps (a) reduction of $CrO_3$ and (b) neutralization (preferably incomplete) of the $CrO_3$ with hydrate of alumina to $Cr_2O_3$, may be reversed without changing the practical result.

To accelerate the start of the reduction of $CrO_3$ there may be added to the solution about 10 milliliters of concentrated hydrogen peroxide. In order to carry out a complete reduction of $CrO_3$ to $Cr_2O_3$ an additional 20% of sugar may be used and other inhibitors such as urotropine, quinoline or potassium and iodide may be added. During the reduction of $CrO_3$ certain amounts of $CO_2$ and water are produced and also hydrogen ions are used up, which brings about neutralization of part of the acid. The end of the reduction may be determined by adding a small amount of hydrogen peroxide. If this addition brings about considerable foaming and causes an instable blue discoloration, the solution still contains hexavalent $CrO_3$.

*Example 2*

100 l. (corresponding to 147 kg.) of a commercial solution of aluminum phosphate (density 1.5), containing 7.5% $Al_2O_3$ and 33.2% $P_2O_5$ having a mol ratio of $Al_2O_3$ to $P_2O_5$ of 1:32 are heated, as described in Example 1 in a reaction vessel equipped with a stirring mechanism, together with 10 kg. of $CrO_3$ to 100° C. Then 2.2 kg. of sugar, dissolved in about 4 l. of water are gradually added. As soon as the exothermic reaction starts, further heating is interrupted. In this case too, part of the $CrO_3$ will not be reduced and remains in the solution as reaction inhibitor.

*Example 3*

The waste electrolyte from electropolishing usually contains about 5–15% of $Cr_2O_3$ and some phosphoric acid, and may also contain sulfuric acid and such ions as Al, Zn, Cu and Fe. The chromium is present partly in trivalent and partly in hexavalent form. These electrolytes are heated as described in the preceding examples and the hexavalent chromium that is present will be reduced by the addition of sugar. For the reduction of 1000 g. of $CrO_3$ there are used about 250 g. of sugar. After completion of the reduction, hydrate of alumina is added up to the point when a film starts to form on the surface of the solution, whereupon the solution is diluted to the desired density, allowed to settle and decanted.

*Example 4*

Monophosphate (metaphosphate) of iron is first prepared by neutralizing one hydrogen equivalent of phosphoric acid. 100 cc. of $H_3PO_4$ (specific gravity=1.61, corresponding to 870 g. $P_2O_5$ per liter) are added to 26 g. Fe-powder. The solution obtained shows only little viscosity and is unstable. However, the precipitated iron phosphate can be dissolved by heating and adding a further quantity of 10 cc. of $H_3PO_4$. If 40.8 g. of $CrO_3$ are added to this solution, the viscosity remains unchanged. After adding, in the manner described in Example 1, 9 g. of a reducing agent such as an industrial type sugar, molasses or sawdust to reduce the hexavalent chromium to trivalent chromium, a highly viscous, honey-like binding agent is obtained, the viscosity of which is still increased when being cooled and which is forming films when drying in air.

*Example 5*

100 cc. of $H_3PO_4$ as described in Example 4 are added to 16 g. ZnO. The solution shows only little viscosity and is unstable, but the zinc phosphate may be dissolved by heating. Then 40.8 g. $CrO_3$ are added and the mixture is treated as described in Example 4.

*Example 6*

100 cc. of $H_3PO_4$ as described in Example 4 are added to 9 g. MgO. The solution is then mixed with 40.8 g. of $CrO_3$ and reduced as described in Example 4.

*Example 7*

A stamping mass for extreme conditions in hot tubes between the furnace and the forging press was prepared by adding 12 percent by weight of a 50% ($D=1.50$) colloidal solution of $0.7Cr_2O_3.1.4Al_2O_3.3P_2O_5$ as prepared according to Example 1, 2 or 3 to a mixture of 33 parts zircon-sand, 33 parts zircon-powder, 33 parts crushed fused quartz (waste material) and 1 part solid sulphite liquor. This mass had an excellent temperature shock resistance and a good crushing strength over a wide range of temperatures:

| ° C.: | Kg. per sq. cm. |
|---|---|
| 20 | 180 |
| 100 | 320 |
| 500 | 445 |
| 800 | 350 |
| 1200 | 390 |

*Example 8*

100 parts by weight of corundum, 10 parts by weight of clay, 2 parts by weight of sulfite waste liquor solids and 9 parts by weight of an about 50% aqueous solution of aluminum-chromium phosphate of the composition $Al_2O_3.Cr_2O_3.3P_2O_5$ (density=1.50) as prepared according to Example 1, 2 or 3 are intimately mixed with 3% of water, whereupon the mixture is pressed to bricks which are then burned at 1500° centigrade. The properties of the resulting bricks are the following:

Compressive strength in the cold __kg. per. sq. cm__ 1030
Refractoriness under load:
    Initial temperature _____° C__ 1560
    Final temperature _____° C__ 1680
Porosity _____percent__ 24.2

*Example 9*

The procedure of Example 2 was repeated, except that the bricks obtained were only dried at 600° C. The characteristics of these bricks were:

Compressive strength in the cold __kg. per sq. cm__ 490
Refractoriness under load:
    Initial temperature _____° C__ 1540
    Final temperature _____° C__ 1690
Porosity _____percent__ 23.8

*Example 10*

A chamotte brick of commercial type and an insulating brick of commercial type, on chamotte base, were united to a composite structure by using a mortar consisting of 25 parts by weight of clay, 75 parts by weight of chamotte powder and 30 parts by weight of a 50% aluminum-chromium phosphate solution of the composition $0.7Cr_2O_3.1.2Al_2O_3.3P_2O_5$ (density=1.50) as prepared according to Example 1. The composite brick obtained was then dried on air for 24 hours, whereupon it was directly placed into a furnace where it was heated to 1100° C. within a period of 7 minutes. The brick was then quenched with cold running water. The chamotte brick as well as the insulating brick showed cracks after quenching, whereas the mortar layer did not show any cracks at all. The bricks were not separated from the mortar layer at any point, but rigidly adherent to said layer.

Example 11

The corundum tube of a pea coal furnace used for the refractoriness under load, which tube was broken, was repaired with the aid of a mortar produced in accordance with Example 10. A great number of load tests determinations at 1700° centigrade was carried out thereafter with this tube, no disadvantages or damages being observed with said tube.

Example 12

A magnesite brick and a light-weight chamotte brick were compounded to a composite structure by means of a mortar consisting of 2 parts by weight of clay and
8 parts by weight of corundum intimately mixed with
3 parts by weight of aluminum-chromium phosphate (d.=1.45) of the composition $0.5Cr_2O_3 \cdot 1.3Al_2O_3 \cdot 3P_2O_5$ as prepared according to Example 1. After one day of drying on air, the mortar was very rigid. The composite brick was heated to 1200° centigrade. The light-weight chamotte part of the composite brick showed cracks resulting from the great thermal expansion of the magnesite part; the connection, however, remained unchanged. That part of the composite brick which has the smaller coefficient of heat expansion should suitably be made up of smaller pieces in order to avoid high tensible stresses.

Example 13

100 kg. iron powder is mixed together with 20 kg. of an approximately 50% aqueous solution of aluminum-chromium phosphate as prepared according to Example 1, 5 kg. acid-hardening phenolic or cresolic resin and 10 grams of dibenzylsulfoxide, to form a viscous matter. This matter is used for coating the inside surfaces of metal cases in which common sintered magnesite is moulded under pressure. The brick was then stored for 24 hours on air. Thereafter, the sheet-metal cases strongly adhered to the bricks, even upon heating to 1500° C.

Example 14

50 kg. iron powder and 50 kg. milled scale ($Fe_3O_4$) are mixed with 40 kg. of an approximately 40% aqueous solution of magnesium-chromium phosphate according to Example 6, 8 kg. of phenolic resin and 20 grams thiourea. This mass is just spreadable. The mass is used for coating the inside of sheet iron cases into which fired or chemically set magnesite or chromium-magnesite bricks are placed. The bricks are allowed to set under moderate pressure at room temperature or moderately elevated temperature (70° C.) for 3-12 hours. The sheet metal cases adhere to the brick material, even upon heating to 1500° C.

Example 15

50 kg. iron powder and 50 kg. LD-dust (from oxygen steelmaking) are mixed with 40 kg. of an approximately 30% aqueous solution of iron-chromium-phosphate according to Example 4 and 20 grams of thiourea. This mass is used for adhesively connecting a magnesite brick and a chromium-magnesite brick, the composite body being dried on air. The two bricks strongly adhere to each other. The composite body was heated to 950° C. and chilled in water. This procedure was repeated five times. It was found that the two bricks broke, but that the adhesive connection between the bricks was not destroyed.

Example 16

100 kg. iron powder are mixed with 20 kg. of an aqueous solution of aluminum-chromium phosphate according to Example 1, 5 kg. of any acid-hardening phenolic resin and 10 grams dibenzylsulfoxide, whereby a spreadable mass is formed which is used as mortar for erecting a brick work of magnesite-chromium bricks. Upon 24 hours drying, the bricks strongly adhered to each other. The brick work was then heated to 1200° C., whereby the bricks unite to form a gapless, monolithic brick work having the same properties as a brick work consisting of sheet-metal encased bricks.

For the following tests sinter magnesite was chosen, having a particle size of 0-2 mm., which gives very bad results when pressed with the usual 1% by weight of waste sulfite liquor, as can be seen from the blank test in the table. This sinter magnesite was mixed with 10% by weight of such a binding agent (corresponding to a content of 6% solids) and 5-7% by weight of water, and the mixture was molded under a pressure of 500 kg. per sq. cm. to shaped bodies. The sample bodies obtained were dried for 12 hours at 110° C., and, if desired, fired for another 2 hours at 1200° C. or at 1500° C. The results obtained are contained in the following table.

TABLE

| | Blank test (1% waste sulfite liquor) | Fe-Cr phosphate | Mg-Cr phosphate | Zn-Cr phosphate |
|---|---|---|---|---|
| Density | 2.47 | 2.42 | 2.38 | 2.43 |
| Porosity (percent) | 27.6 | 28.4 | 29.4 | 28.2 |
| Strength (kg. per sq. cm.): | | | | |
| Dried at 100° C | 43 | 135 | 128 | 197 |
| Fired at 1,200° C | 26 | 116 | 66 | 242 |
| Fired at 1,500° C | 140 | 214 | 58 | 198 |

What I claim is:

1. In a process of producing a stable, highly viscous, film-forming binding agent for refractory materials, the steps comprising dissolving in a solution of a monophosphate of a metal selected from the group consisting of Al, Fe, Zn and Mg, at temperatures of about 100° C. a hexavalent chromium oxide ($CrO_3$); and reducing at least the major part of said $CrO_3$ to trivalent chromium oxide ($Cr_2O_3$) with the help of a reducing substance selected from the group consisting of an industrial sugar molasses and sawdust under controlled temperature conditions to prevent the reduction of said $CrO_3$ to $Cr_2O_3$ by said reducing substance from becoming violent;

the molar ratio of said metal to said $Cr_2O_3$ being between 1 to 0.1 and 1 to 1.

2. A stable, highly viscous binding agent for refractory materials possessing film-forming properties consisting essentially of the product made by dissolving in a solution of a monophosphate of a metal selected from the group consisting of Al, Fe, Zn and Mg, at tempertaures of about 100° C. a hexavalent chromium oxide ($CrO_3$), reducing at least the major part of said $CrO_3$ to trivalent chromium oxide ($Cr_2O_3$) with the help of a reducing substance selected from the group consisting of an industrial sugar, molasses and sawdust under controlled temperature conditions to prevent the reduction of said $CrO_3$ to $Cr_2O_3$ by said reducing substance from becoming violent, the molar ratio of said metal to said $Cr_2O_3$ being between 1 to 0.1 and 1 to 1.

3. In a process of producing a stable, highly viscous, film-forming binding agent for refractory materials, the steps comprising dissolving a hexavalent chromium oxide ($CrO_3$) in a phosphoric acid solution at a temperature of about 100° C., reducing at least the major part of the $CrO_3$ in this solution, to trivalent chromium oxide ($Cr_2O_3$) with the help of a reducing substance selected from the group consisting of an industrial sugar, molasses and sawdust under controlled temperature conditions to prevent the reduction of said $CrO_3$ to $Cr_2O_3$ by said reducing substance from becoming violent, and then neutralizing said phosphoric acid solution by the addition of aluminum oxide, the molar ratio of said metal to said $Cr_2O_3$ being between 1 to 0.1 and 1 to 1.

4. In a process, as claimed in claim 1, wherein said metal and said $Cr_2O_3$ are present in amounts which substitute from 1.3 to 2.2 of the three hydrogen ions of phosphoric acid ($H_3PO_4$).

5. In a process of producing a binding agent according to claim 1 wherein said binding agent is mixed with from 20 to 95% by weight of powdered lean materials selected from the group consisting of metallic Fe powder, $Fe_2O_3$ powder, $Fe_3O_4$ powder, and chromite ore powder.

6. In a process according to claim 5 in which there is added from 0.003 to 0.1% by weight of an agent operative to inhibit a reaction between said metallic Fe powder and said binding agent.

7. In a process according to claim 6 wherein said inhibiting agent is selected from the group consisting of urotropine, quinoline and potassium iodide.

8. In a process of producing a binding agent according to claim 1 in which said binding agent is mixed with 1 to 10% by weight of an acid hardening thermosetting resin selected from the group consisting of phenolic, cresolic and xylenolic resin.

9. In a process according to claim 6 wherein said reducing substance is added in amounts insufficient to bring about complete reduction of $CrO_3$ to $Cr_2O_3$ so as to retain small amounts of $Cr_2O_3$ in the finished binding agent which will act as inhibitor to prevent a reaction between said metallic Fe powder and said binding agent.

10. A binding agent as claimed in claim 2 wherein said metal and said $Cr_2O_3$ are present in amounts which substitute from 1.3 to 2.2 of the three hydrogen ions of phosphoric acid ($H_3PO_4$).

11. A binding agent as claimed in claim 2 containing from 20 to 95% by weight of a powdered lean material selected from the group consisting of metallic Fe powder, $Fe_2O_3$ powder, $Fe_3O_4$ powder and chromite ore powder.

12. A binding agent as claimed in claim 11 containing from 0.003 to 0.1% by weight of an agent operative to inhibit a reaction between said metallic Fe powder and said binding agent.

13. A binding agent as claimed in claim 12 wherein the inhibiting agent is a substance selected from the group consisting of urotropine, quinoline and potassium iodide.

14. A binding agent as claimed in claim 12, wherein an excess of free chromic acid ($CrO_3$) is present which acts as an inhibiting agent.

15. A binding agent as claimed in claim 2 containing chromic ore in powdered form.

References Cited

UNITED STATES PATENTS 2,272,039   2/1942   Morgan _____ 106—66

TOBIAS E. LEVOW, *Primary Examiner.*

J. E. POER, *Assistant Examiner.*